United States Patent
Chen

(10) Patent No.: US 10,893,656 B2
(45) Date of Patent: Jan. 19, 2021

(54) PET FURNITURE

(71) Applicant: Li-Chen Chen, Tainan (TW)

(72) Inventor: Li-Chen Chen, Tainan (TW)

(*) Notice: Subject to any disclaimer, the term of this patent is extended or adjusted under 35 U.S.C. 154(b) by 379 days.

(21) Appl. No.: 15/862,415

(22) Filed: Jan. 4, 2018

(65) Prior Publication Data
US 2018/0368367 A1 Dec. 27, 2018

(30) Foreign Application Priority Data
Jun. 23, 2017 (TW) .............................. 106209184 U

(51) Int. Cl.
*A01K 1/015* (2006.01)
*A01K 1/03* (2006.01)
*A01K 15/02* (2006.01)

(52) U.S. Cl.
CPC ............ *A01K 1/0157* (2013.01); *A01K 1/033* (2013.01); *A01K 15/024* (2013.01)

(58) Field of Classification Search
CPC ..... A01K 1/0157; A01K 1/033; A01K 15/024
USPC ........................................................ 119/498
See application file for complete search history.

(56) References Cited

U.S. PATENT DOCUMENTS

| | | | | | |
|---|---|---|---|---|---|
| 3,486,485 | A | * | 12/1969 | Kahanick | A01K 15/024 119/706 |
| 4,177,761 | A | * | 12/1979 | Bellocchi, Jr. | A01K 1/035 119/482 |
| 4,347,807 | A | * | 9/1982 | Reich | A01K 1/033 119/499 |
| 4,803,952 | A | * | 2/1989 | Houser | A01K 1/033 119/499 |
| 4,986,217 | A | * | 1/1991 | Robinson | A01K 1/0125 119/168 |
| 5,964,189 | A | * | 10/1999 | Northrop | A01K 15/024 119/482 |
| 6,487,990 | B1 | * | 12/2002 | McNew | A01K 1/0125 119/168 |
| 6,886,495 | B1 | * | 5/2005 | Madden | A01K 1/033 119/482 |
| D554,303 | S | * | 10/2007 | Linehan | D30/160 |
| 7,584,720 | B1 | * | 9/2009 | Jackson | A01K 1/033 119/452 |
| 10,098,319 | B1 | * | 10/2018 | Rosenberg | A01K 1/033 |
| 10,111,406 | B2 | * | 10/2018 | Rogers | B32B 7/05 |
| 2004/0139926 | A1 | * | 7/2004 | Diep | A01K 15/024 119/601 |
| 2006/0102092 | A1 | * | 5/2006 | Cortez | A01K 1/0125 119/498 |
| 2008/0295782 | A1 | * | 12/2008 | Ebert | A01K 15/024 119/706 |

(Continued)

FOREIGN PATENT DOCUMENTS

JP 3215623 U * 4/2018 .......... A01K 15/024

*Primary Examiner* — Christopher P Ellis
(74) *Attorney, Agent, or Firm* — Li & Cai Intellectual Property (USA) Office

(57) ABSTRACT

A pet furniture including a box and a plurality of sheets is provided. The box includes an accommodating recess concavely formed on a side thereof, and the plurality of sheets are detachably and erectly disposed in the accommodating recess. When the plurality of sheets are disposed in the accommodating recess, the narrow side of each of the plurality of sheets is exposed at the opening of the accommodating recess.

9 Claims, 17 Drawing Sheets

(56) References Cited

U.S. PATENT DOCUMENTS

| | | | | |
|---|---|---|---|---|
| 2010/0006037 | A1* | 1/2010 | Salzman | A01K 15/024 |
| | | | | 119/484 |
| 2013/0206079 | A1* | 8/2013 | Lipscomb | A01K 15/024 |
| | | | | 119/706 |
| 2013/0333629 | A1* | 12/2013 | Paculdo | A01K 15/024 |
| | | | | 119/706 |
| 2014/0014043 | A1* | 1/2014 | McCann | A01K 15/024 |
| | | | | 119/706 |
| 2016/0338315 | A1* | 11/2016 | Floyd | A01K 15/024 |
| 2016/0338316 | A1* | 11/2016 | Niedwick | A01K 15/024 |
| 2016/0338320 | A1* | 11/2016 | Floyd | A01K 15/024 |
| 2017/0339916 | A1* | 11/2017 | Deraps | C08G 79/04 |
| 2018/0271060 | A1* | 9/2018 | Hansen | A01K 13/004 |
| 2018/0332822 | A1* | 11/2018 | Diskin | A01K 15/024 |
| 2020/0093091 | A1* | 3/2020 | Lu | A01K 15/024 |

* cited by examiner

PET FURNITURE

BACKGROUND OF THE INVENTION

1. Field of the Invention

The present disclosure relates to a pet furniture; more particularly, to a pet toy.

2. Description of Related Art

In recent years more and more people keep pets, in which cats and dogs are among the most popular types of pets. To prevent pets from biting and scratching furniture, a common solution is to buy them toys, such as cat scratching boards. However, when a cat scratch board is partially bitten or scratched, the pet owner has to throw the whole cat scratch board away, which is a waste. Accordingly, the present disclosure provides a solution that solves the above-mentioned problem.

SUMMARY OF THE INVENTION

One of the objectives of the present disclosure is to provide a pet furniture that solves the problem of conventional cat scratch boards in which the cat scratch boards cannot be partially replaced, which causes a waste.

To achieve the above-mentioned objective, one embodiment of the present disclosure provides a pet furniture including a box and a plurality of sheets. The box includes an accommodating recess concavely formed on a side thereof. The plurality of sheets are detachably and erectly disposed in the accommodating recess, in which when the plurality of sheets are in the accommodating recess, the narrow side of each of the plurality of sheets is exposed at the opening of the accommodating recess.

The present disclosure is advantageously in that the pet furniture provided by the present disclosure can be replaced in part and not wholly, thereby reducing waste.

For a better understanding of the present disclosure, the following embodiments are provided along with illustrations to facilitate the disclosure of the present disclosure.

DETAILED DESCRIPTION OF THE PREFERRED EMBODIMENTS

Figure 1:
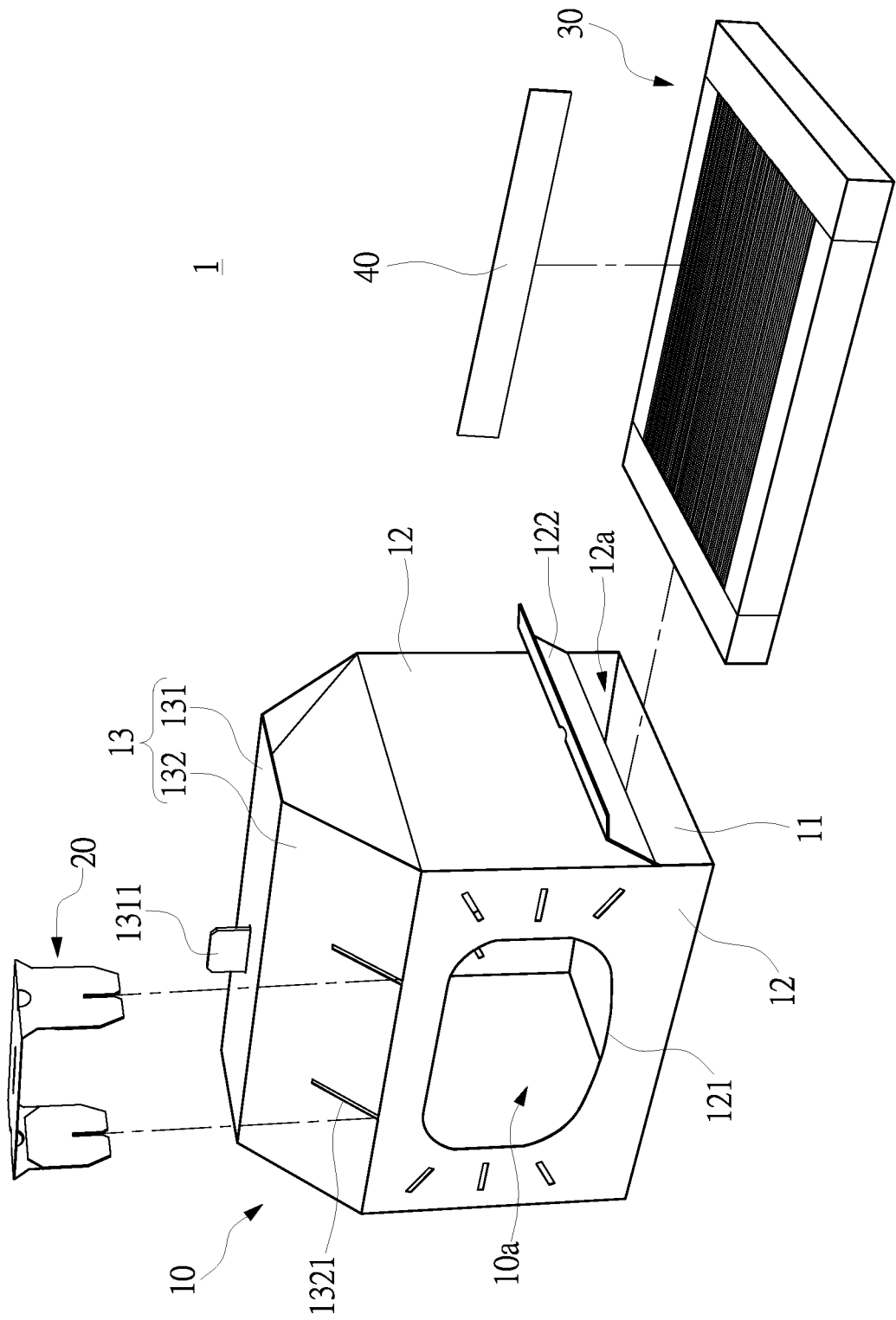
FIGS. 1 and 2 are schematic views of a partially disassembled pet furniture according to the present disclosure.
Figure 2:
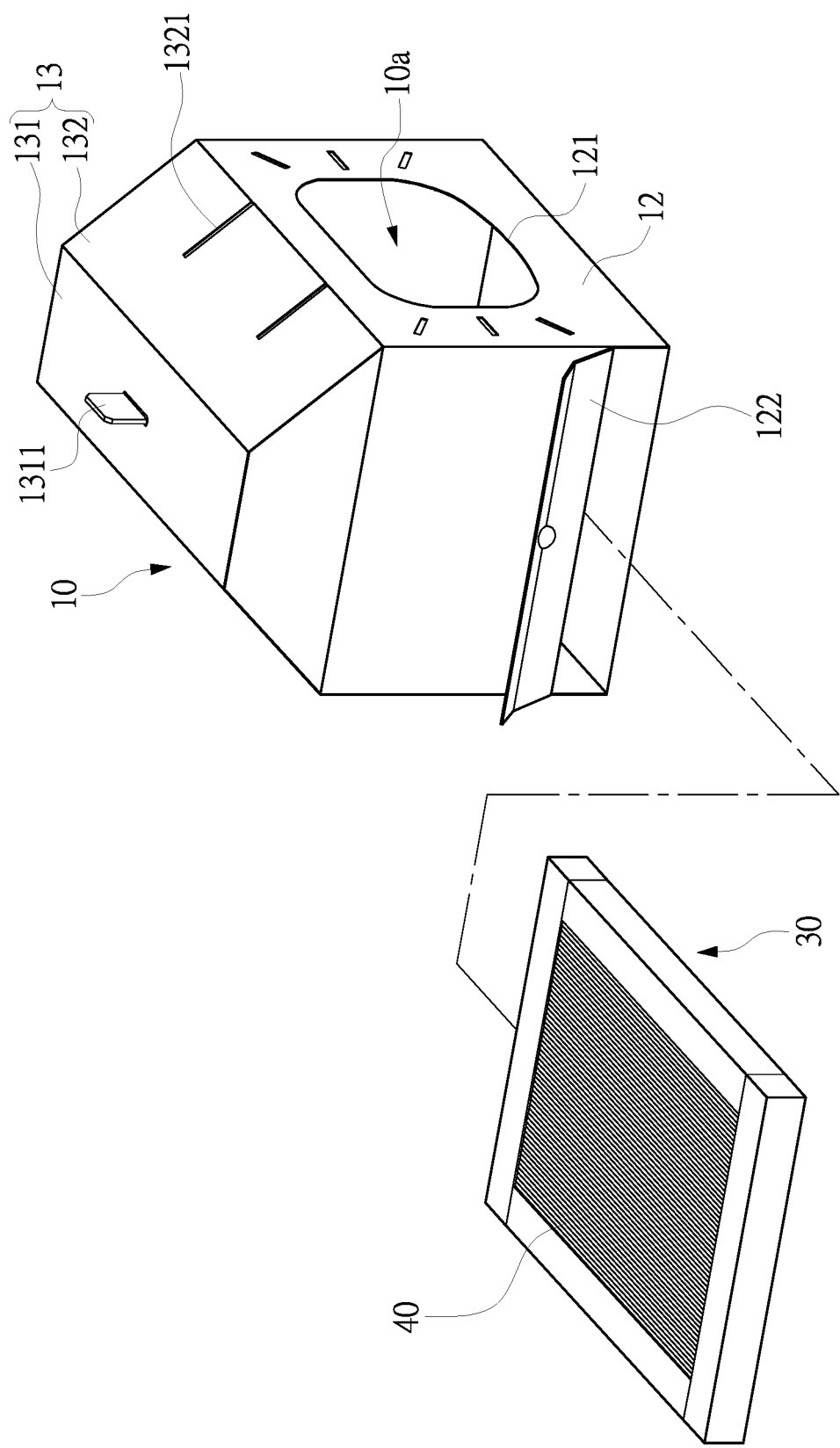

The aforementioned illustrations and following detailed description are exemplary for the purpose of further explaining the scope of the present disclosure. Other objectives and advantages related to the present disclosure will be illustrated in the following description and appended drawings.

With reference to FIGS. 1, 2, 3A and 3B, in which the schematic views illustrate the pet furniture of the present disclosure partially disassembled. As shown in the figures, the pet furniture 1 includes a box 10, an engaging part 20 and an auxiliary carrier 30. Specifically, the box 10 has an accommodating space 10*a* formed therein, and the auxiliary carrier 30 can optionally be disposed in the accommodating space 10*a*.

The box 10 includes a bottom board 11, four surrounding boards 12, and a top portion 13. The edges of the bottom board 11 are connected to the surrounding boards 12, and the top portion 13 is connected to the surrounding boards 12. Two of the surrounding boards 12 each include an opening 121 through which the accommodating space 10*a* communicates with the outer space. In practice, the openings 121 can have an appearance different from that illustrated in the drawings, and the position thereof can differ according to actual needs as well. The top portion 13 includes two side boards 132 each including two engaging structures 1321. In practice, the number of the engaging structure 1321 of each side board 132 can differ and is not limited thereto. In other embodiments, only one side board 132 includes the engaging structures 1321, and in yet other embodiments, more than two side boards 132 include the engaging structures 1321. Moreover, in some other embodiments, the engaging structures 1321 can be formed on the surrounding boards 12 and not on the top portion 13. Furthermore, in practice, the area of the bottom board 11 is equal to or larger than that of the auxiliary carrier 30 so that the auxiliary carrier 30 can be accommodated in the accommodating space 10*a*.

Figure 3A:
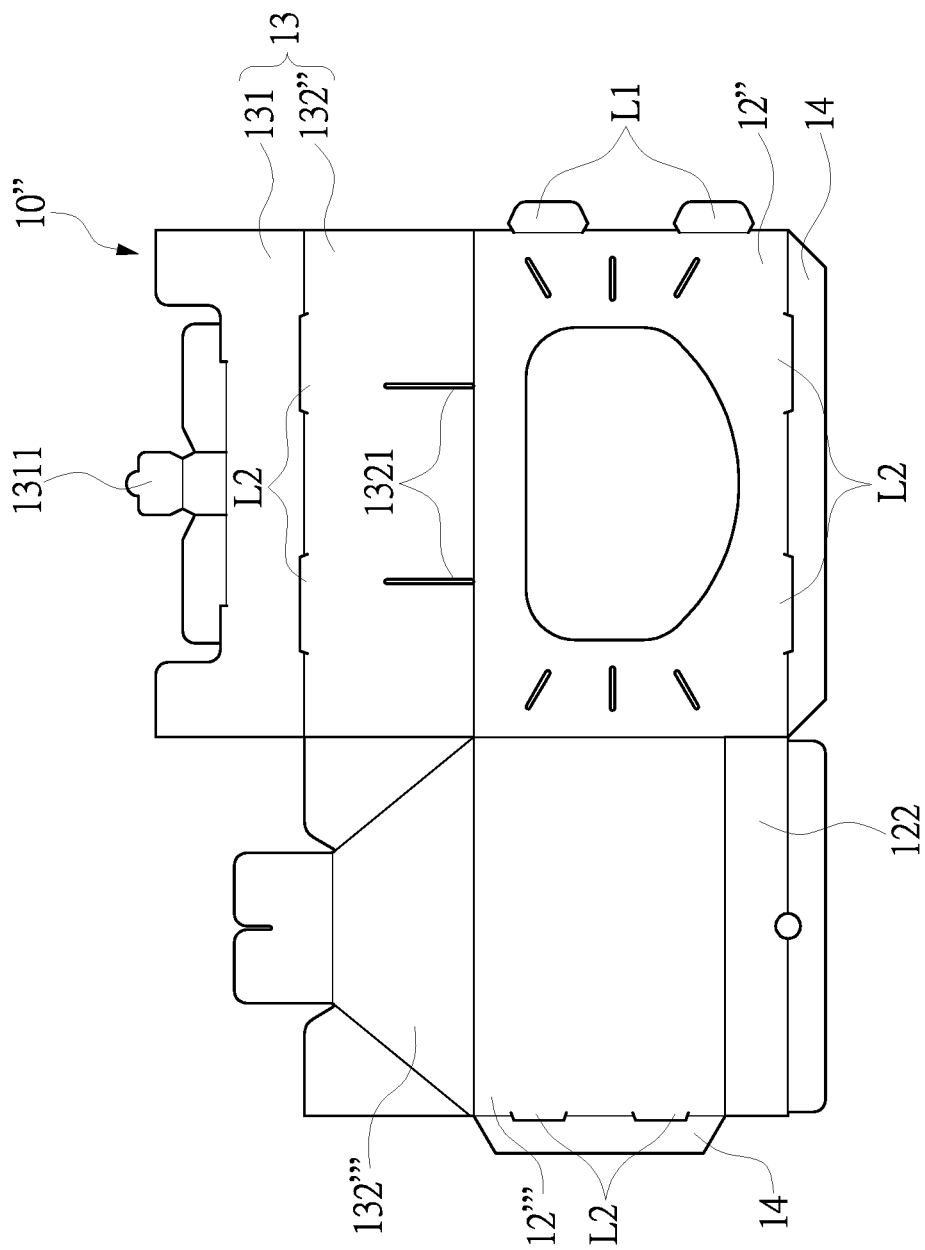
FIGS. 3A and 3B are schematic views illustrating a box of the pet furniture according to the present disclosure.
Figure 3B:
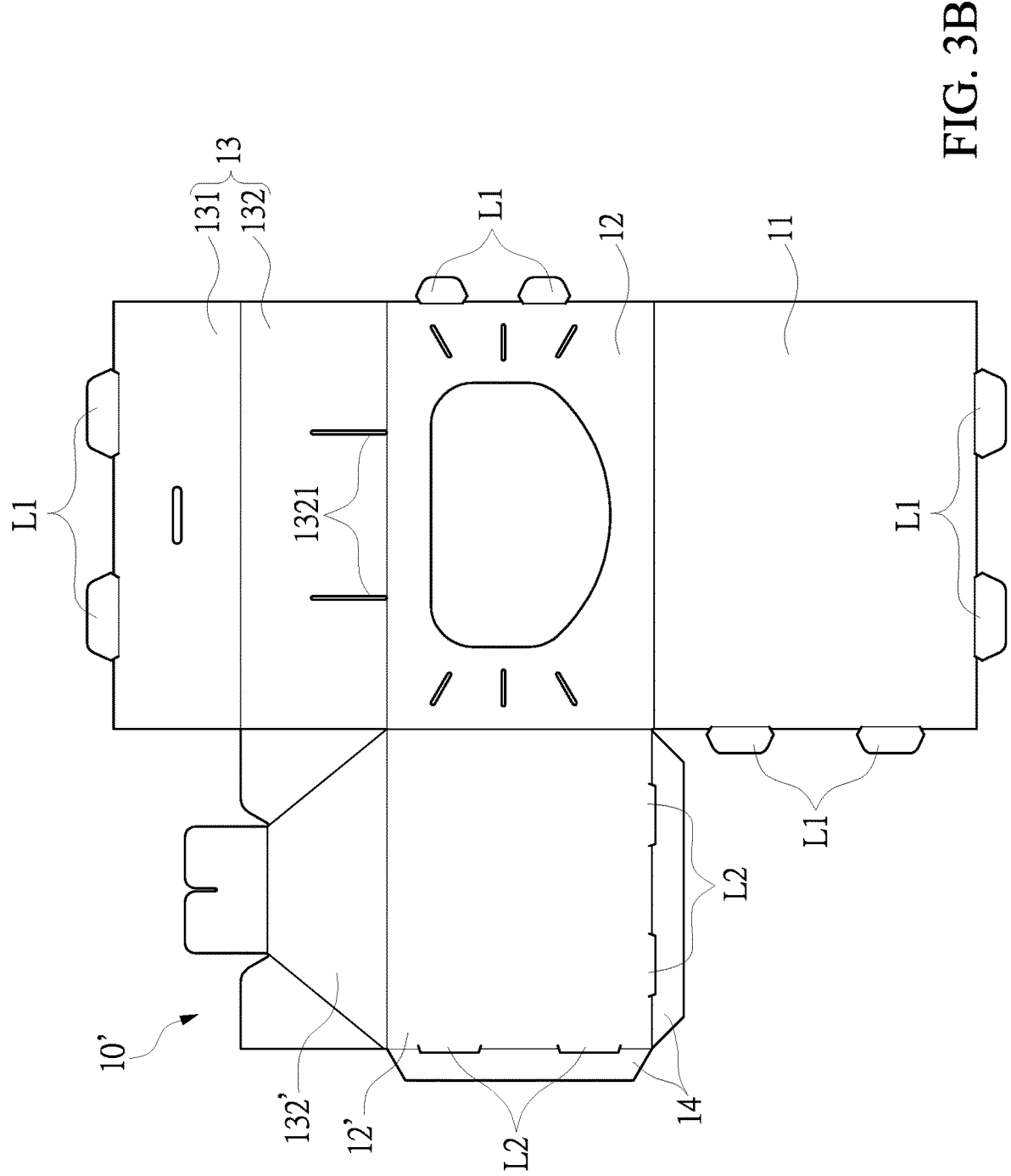
Figure 4:
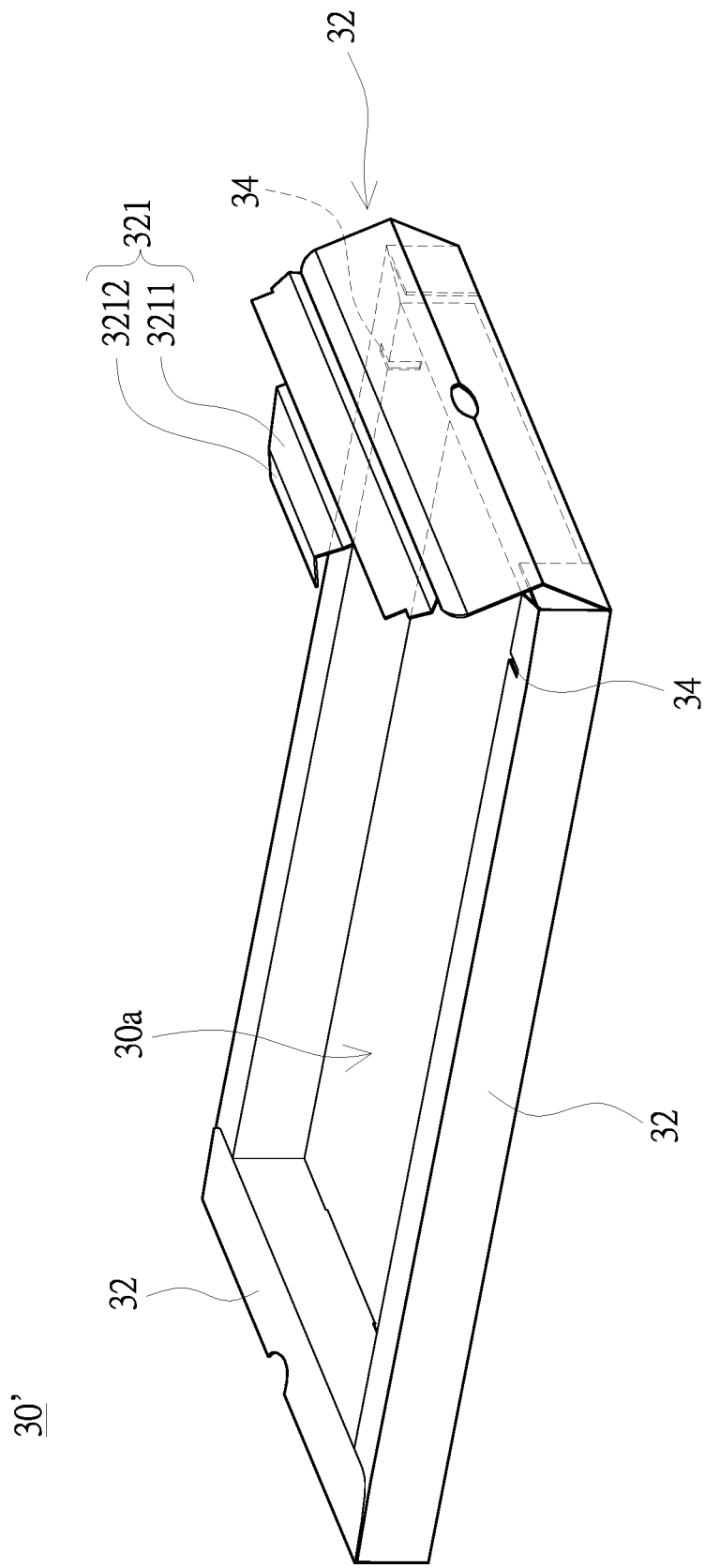
FIG. 4 is a schematic view of the box of the pet furniture according to the present disclosure partially disassembled.

With reference to FIGS. 3A and 3B, in practice, the box 10 is formed by folding the first cardboard 10' and the second cardboard 10" and then engaging the first cardboard 10' with the second cardboard 10". In the present embodiment, the top portion 13 includes a top board 131 and four side boards 132; however, the present disclosure is not limited thereto. As shown in FIG. 3B, the first cardboard 10' includes a bottom board 11 and two surrounding boards 12, 12', and the top portion 13 includes two side boards 132, 132' and a top board 131. The first cardboard 10' and the second cardboard 10" engage each other to form the box 10.

Three sides of the surrounding board 12 of the first cardboard 10' are bendably connected to the bottom board 11, the surrounding board 12' and one of the side boards 132 of the top portion 13, in which the side board 12 includes an opening 121. Another side of the surrounding board 12' is bendably connected to the side board 132' of the top portion 13, and the other two sides of the surrounding board 12' are bendably connected to two auxiliary boards 14. Another side of the side board 132 is bendably connected to the top board 131 of the top portion 13. Specifically, two sides of the bottom board 11, one side of the surrounding board 12 and one side of the top board 131 extend outwards so as to form a plurality of first connecting structures L1, and a plurality of second connecting structures L2 are formed between the surrounding board 12' and two auxiliary boards 14. The second connecting structures L2 can be, but not limited to, through holes. One of the side boards 132 of the top portion 13 can have two engaging structures 1321 formed therein. The engaging structures 1321 can be, but not limited to, through holes.

As shown in FIG. 3A, two sides of the surrounding board 12" of the second cardboard 10" are bendably connected to the surrounding board 12''' and one of the side boards 132" of the top portion 13. The surrounding board 12" has an opening, and another side of the side board 132" is bendably connected to the top board 131 of the top portion 13. One side of the surrounding board 12''' is bendably connected to the side board 132''' of the top portion 13. One side of the surrounding board 12" extends outwards to form the plurality of first connecting structures L1. One side of the two surrounding boards 12", 12''' extends outwards to form an auxiliary board 14. A plurality of second connecting structures L2 are formed between each surrounding board 12", 12''' and the auxiliary board 14. Furthermore, a plurality of second connecting structures L2 are formed between the side board 132" and the top board 131. The second connecting structure L2 can be, but not limited to, through holes.

As described above, the second connecting structures L2 of the surrounding board 12' of the first cardboard 10' correspond to the first connecting structures L1 of the surrounding board 12" of the second cardboard 10" and engage therewith. The first connecting structures L1 of the bottom board 11 of the first cardboard 10' can engage with the second connecting structures L2 of the surrounding board 12' of the first cardboard 10' and those of the surrounding boards 12", 12''' of the second cardboard 10". The second connecting structures L2 of the surrounding boards 12", 12''' of the second cardboard 10" can engage with the first connecting structures L1 of the surrounding boards 12, 12' of the first cardboard 10'. The first connecting structures L1 of the top portion 13 of the first cardboard 10' can engage with the second connecting structures L2 of the top portion 13 of the second cardboard 10". In this way, the first cardboard 10' and the second cardboard 10" can be assembled together to form the box 10 as shown in FIG. 1. Needless to say, the box 10 can be formed of more cardboards engaged with each other or a single cardboard folded. The present disclosure is not limited thereto. Furthermore, the structure of the top portion 13 and its appearance after being assembled are not limited to and may differ from that illustrated in the drawings according to various embodiments.

With reference to FIGS. 1 to 3B, in a preferred embodiment, one of the surrounding boards 12 can include a liftable door panel 122, which enables the accommodating space 10a to optionally communicate with the outer space. When the accommodating space 10a communicates with the outer space through the liftable door panel 122, the auxiliary carrier 30 can be disposed in the accommodating space 10a via the through hole 12a formed on the surrounding board 12 corresponding to the liftable door panel 122. In this way, a user can replace the auxiliary carrier 30 through the liftable door panel 122.

With reference to FIGS. 1, 4, 5 and 6, the auxiliary carrier 30 includes a housing 30' and a plurality of sheets 40. The housing 30' has an accommodating recess 30a concavely formed on a side thereof. The plurality of sheets 40 are detachably disposed in the accommodating recess 30a, in which each sheet 40 has a wave-shaped structure on the narrow side thereof. When the plurality of sheets 40 are in the accommodating recess 30a, the narrow side of each of the plurality of sheets 40 is exposed at the opening of the accommodating recess 30a. In practice, the plurality of sheets 40 can be corrugated paper, which serves as card scratch boards. Needless to say, the user can place other objects in the accommodating recess 30a instead of the sheets 40. For example, the user can place pet diapers in the accommodating recess 30a. In this way, with the auxiliary carrier 30 and the liftable door panel 122 formed correspondingly thereto, the user can easily replace cat scratch boards, pet diapers, etc.

Figure 5:
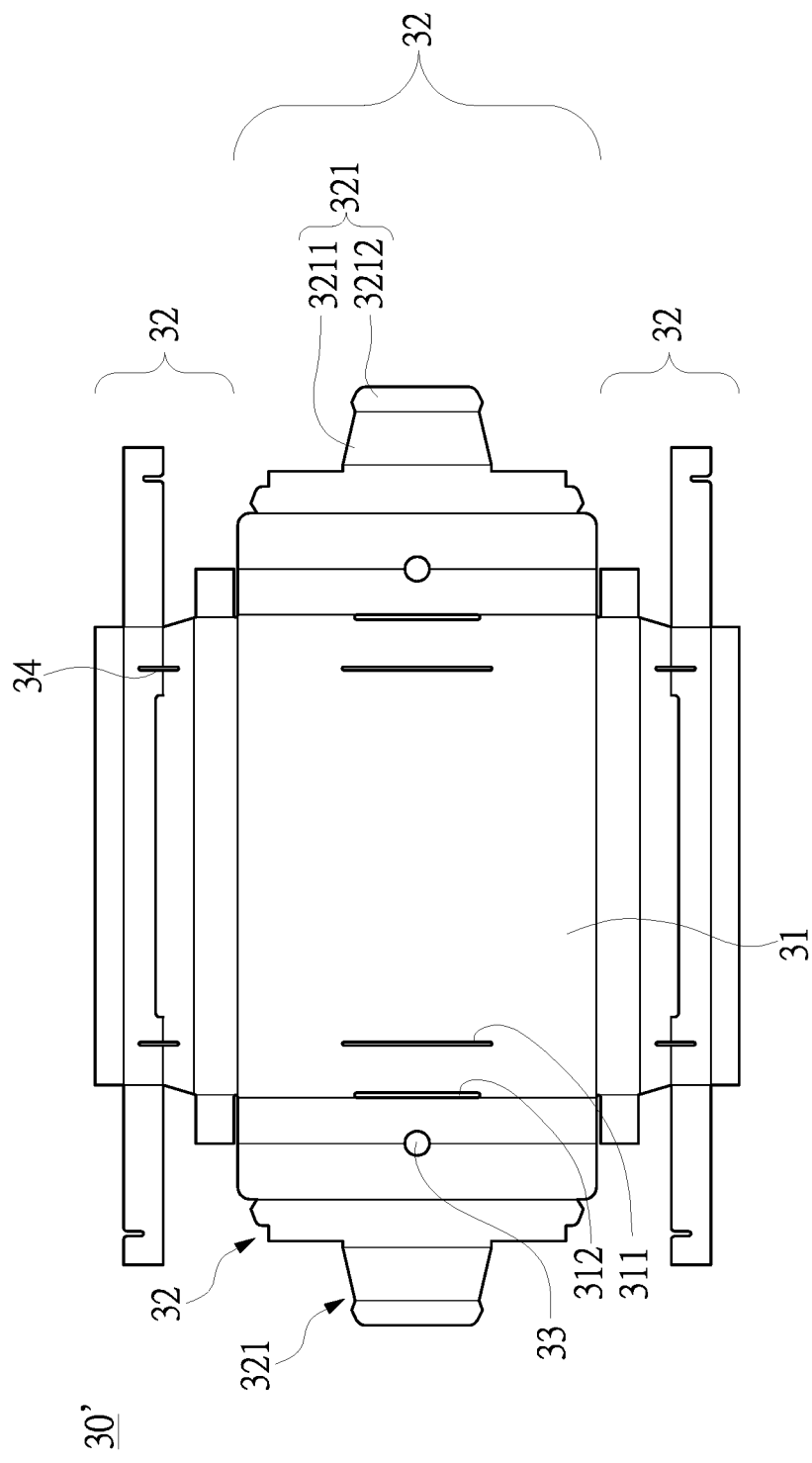
FIG. 5 is a schematic view of the box of the pet furniture according to the present disclosure unfolded.
Figure 6:
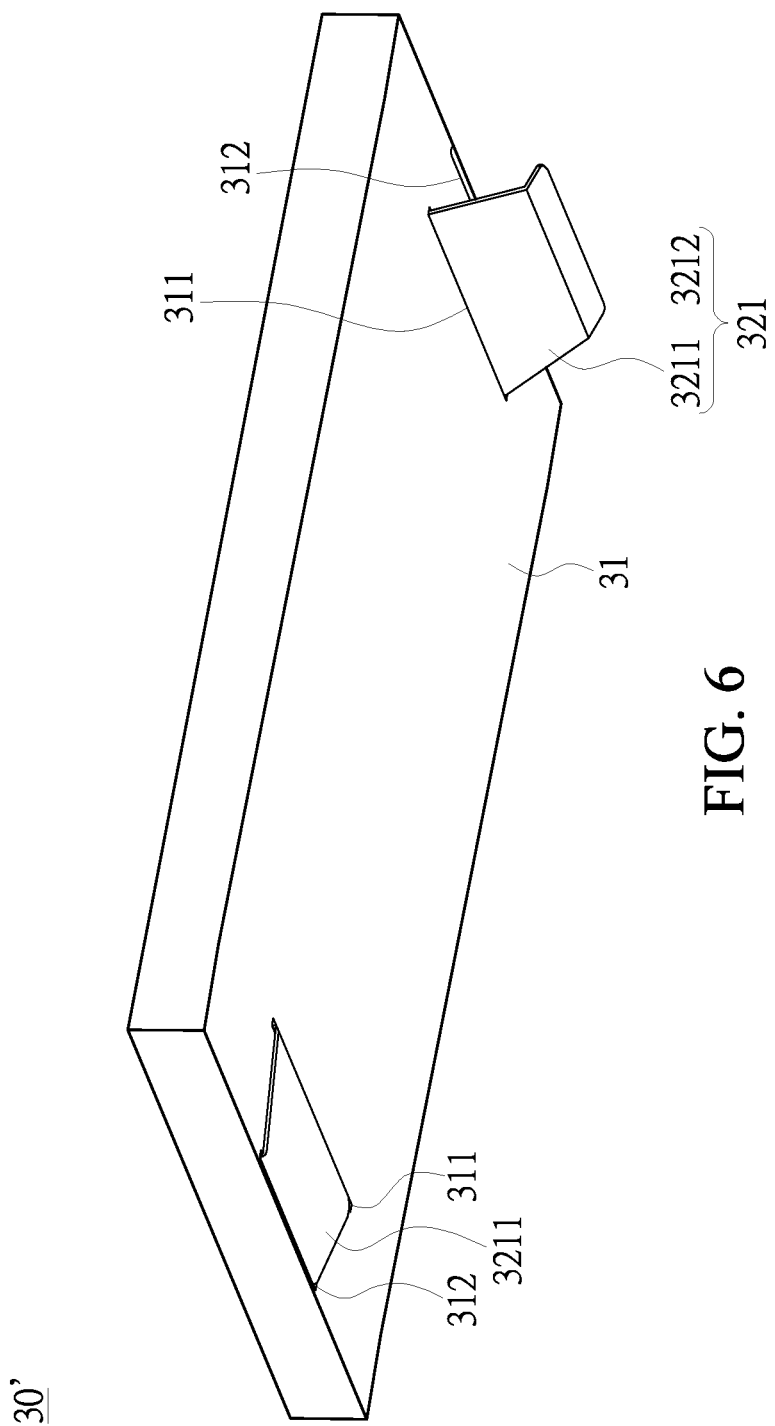
FIG. 6 is a schematic view of the box of the pet furniture partially disassembled and seen from another point of view.

More specifically, referring to FIGS. 5 and 6, the housing 30' can include a bottom board 31 and four side boards 32 bendably connected to the edges of the bottom board 31. The bottom board 31 includes a first engaging through hole 311 and a second engaging through hole 312 spaced apart from each other and disposed near the at least one side wall board 32. The sides of the two side wall boards 32 opposite each other and near the first engaging through hole 311 extend outwards to form an auxiliary engaging portion 321. Each auxiliary engaging portion 321 includes a first auxiliary board 3211 and a second auxiliary board 3212. Specifically, the width of each first auxiliary board 3211 and that of each second auxiliary board 3212 are equal to or smaller than the widths of the first engaging through hole 311 and the second engaging through hole 312 corresponding thereto.

With reference to FIG. 6, when the side wall boards 32 and the bottom board 31 jointly form the housing 30', each auxiliary engaging portion 321 passes through the corresponding second engaging through hole 312 to be located on the side of the bottom board 31 opposite the accommodating recess 30a. Furthermore, the second auxiliary board 3212 passes through the first engaging through hole 311 correspondingly. In this way, the structural strength of the auxiliary carrier 30 is reinforced.

In practice, the auxiliary carrier 30 can include at least two auxiliary holding structures 33. With the auxiliary holding structures 33, the user can withdraw the auxiliary carrier 30 from the accommodating space 10a. The present disclosure does not limit the way the auxiliary holding structures 33 are exemplified. The auxiliary holding structures 33 can be recesses, ropes or any structures that include protrusions or recesses.

Moreover, it should be noted that two side wall boards 32 can include two auxiliary fixing through holes 34, and when the bottom board 31 together with the side wall boards 32 form the housing 30', a part of the two side wall boards 32 is inserted into the auxiliary fixing through holes 34 correspondingly so as to strengthen the structure of the housing 30'.

Figure 7:
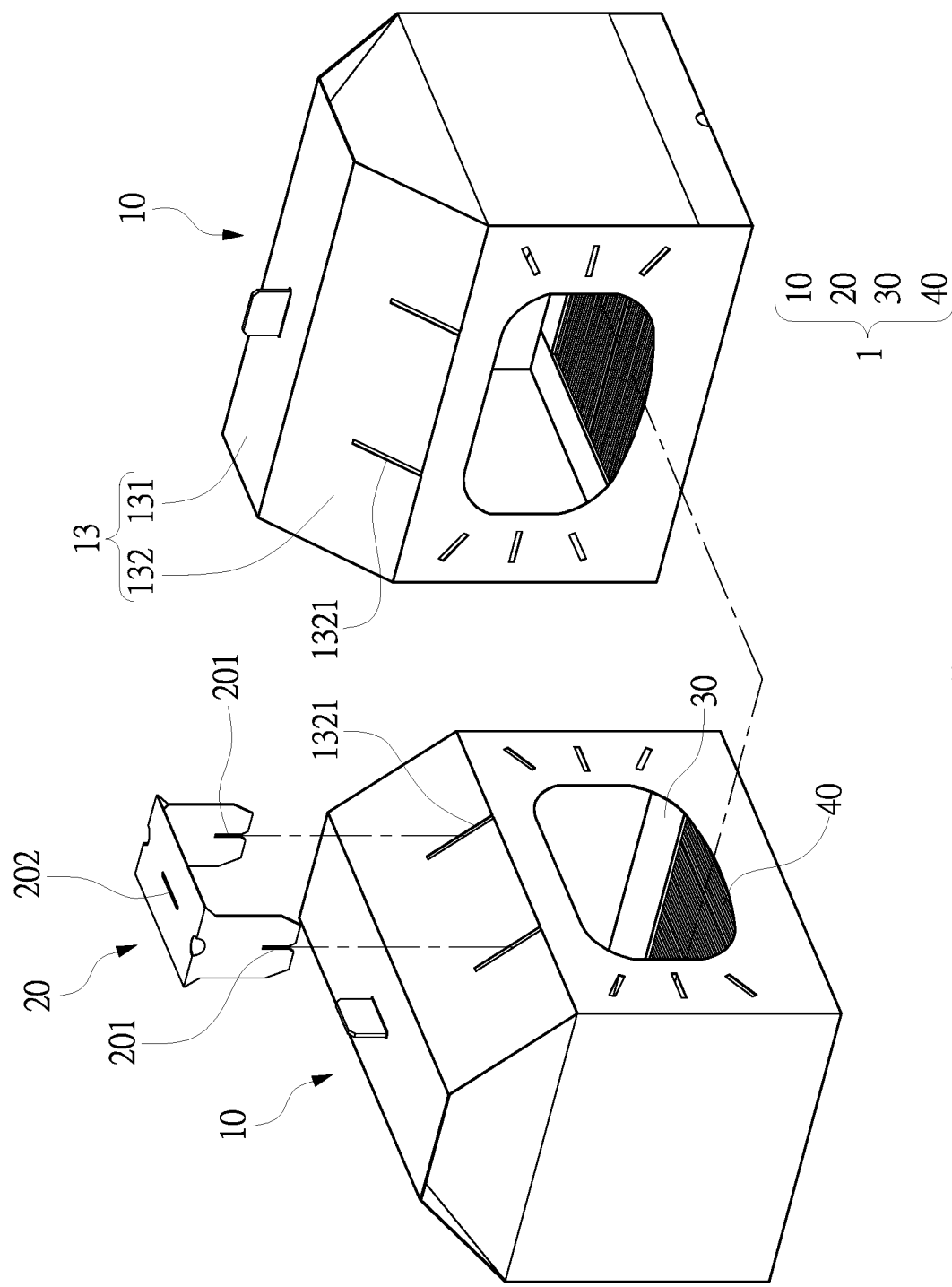
FIG. 7 is a schematic view of two pieces of the pet furniture according to the present disclosure disassembled apart from each other.
Figure 8:
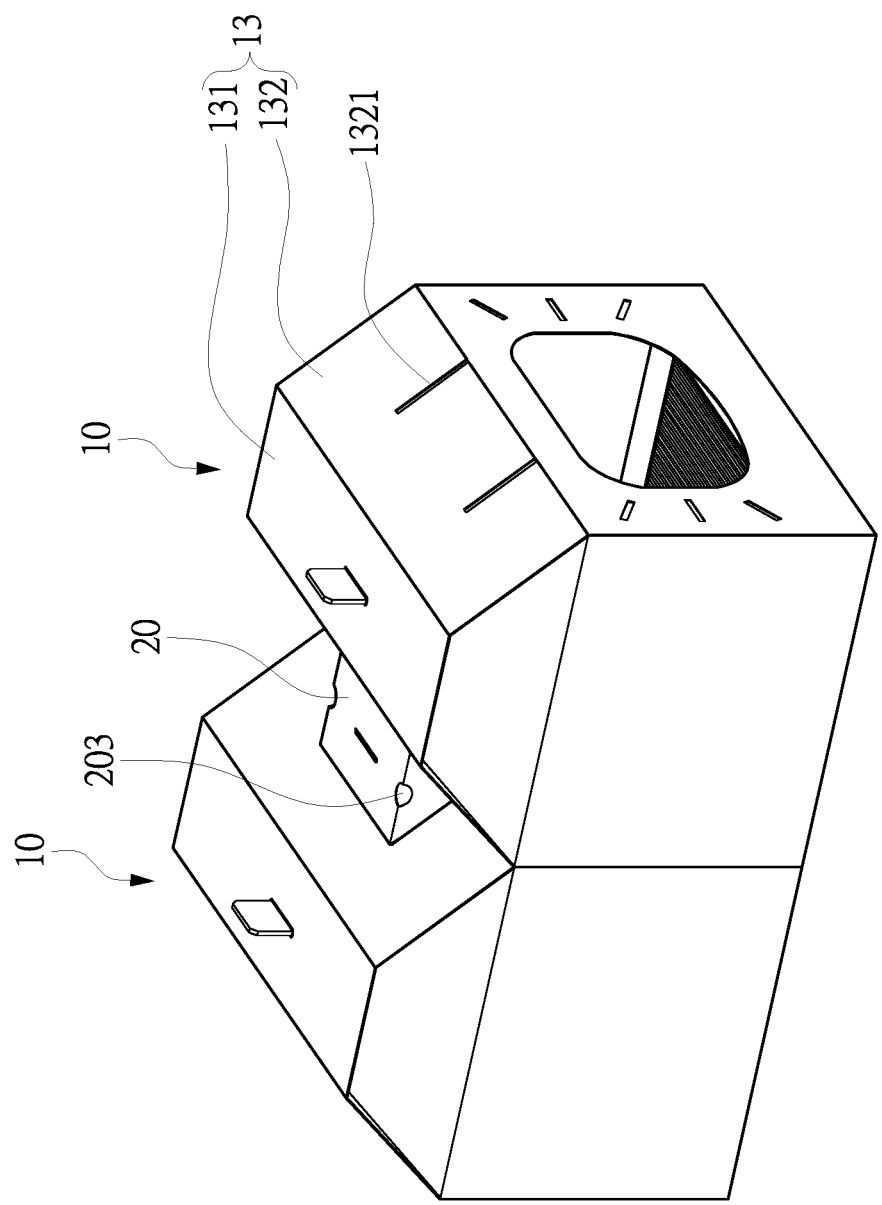
FIGS. 8 and 9 are schematic views illustrating two pieces of the pet furniture according to the present disclosure assembled together.
Figure 9:
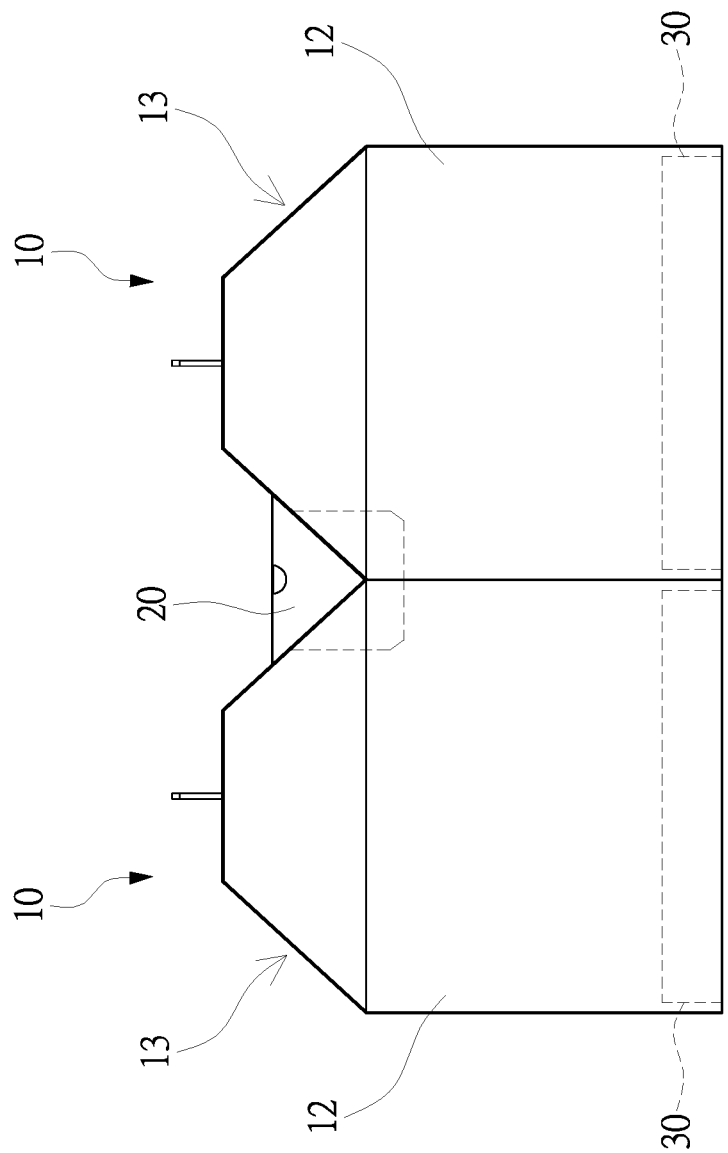
Figure 10:
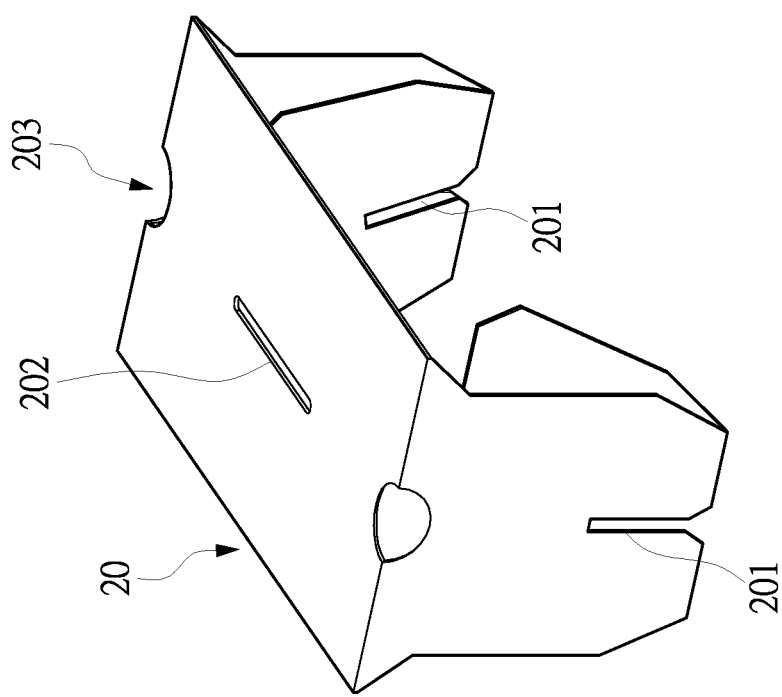
FIG. 10 is a schematic view of an engaging part of the pet furniture according to the present disclosure.

Referring to FIGS. 7 to 9, each side board 132 of the pet furniture 1 includes a plurality of engaging structures 1321, and a part of the engaging part 20 is inserted into the engaging structures 1321 of the pet furniture 1. In this way, the two pieces of pet furniture 1 can be fixedly connected to each other through the engaging part 20 and the engaging structures 1321. More specifically, referring to FIGS. 10 and 11, in which the engaging part 20 unfolded is shown. The engaging part 20 is a cardboard formed of three portions, two end portions of which are bendably connected to the middle portion. The two end portions each include an engaging groove 201. The two end portions of the engaging part 20 are inserted into the engaging structures 1321 of the two pieces of pet furniture 1, and each engaging groove 201 fixes a part of the pet furniture 1. Needless to say, the structure of the engaging part 20 and the engaging structure used for engaging the two pieces of pet furniture 1 can differ as the embodiment of the present disclosure differs. Moreover, the engaging part 20 can engage the pet furniture 1 at positions different from that illustrated in the drawings. For example, the engaging part 20 can engage the top board 131, the surrounding board 12 or the bottom board 11. Furthermore, the engaging part 20 can include an auxiliary structure 203, which can be exemplified as a through hole and through which the user can pick up the engaging part 20. However, the present disclosure is not limited thereto. In practice, the auxiliary structure 203 can be exemplified as any other structures that help the user separate the engaging part 20 from the two pieces of pet furniture 1.

Figure 12:
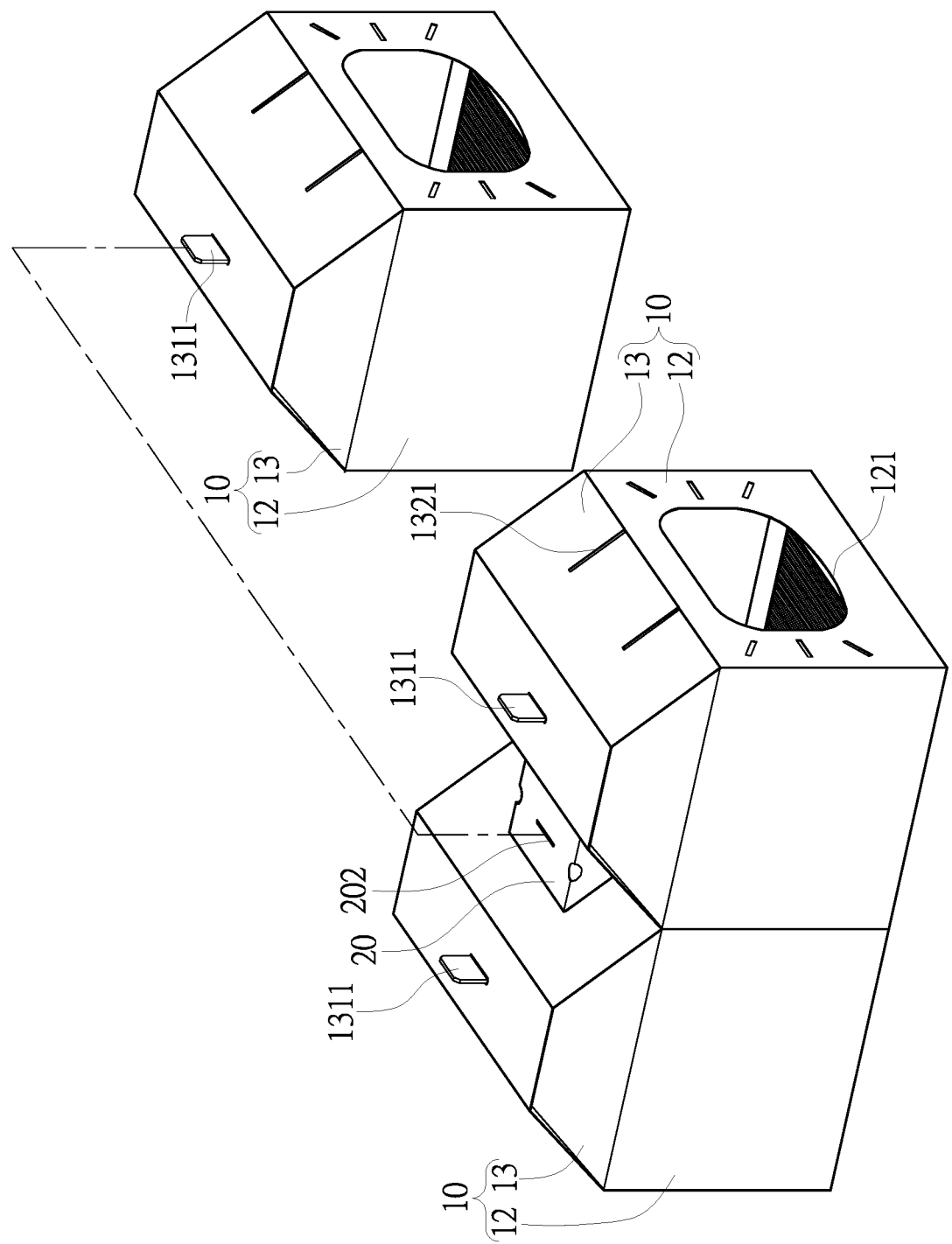
FIG. 12 is a schematic view of three pieces of the pet furniture according to the present disclosure assembled together.
Figure 13:
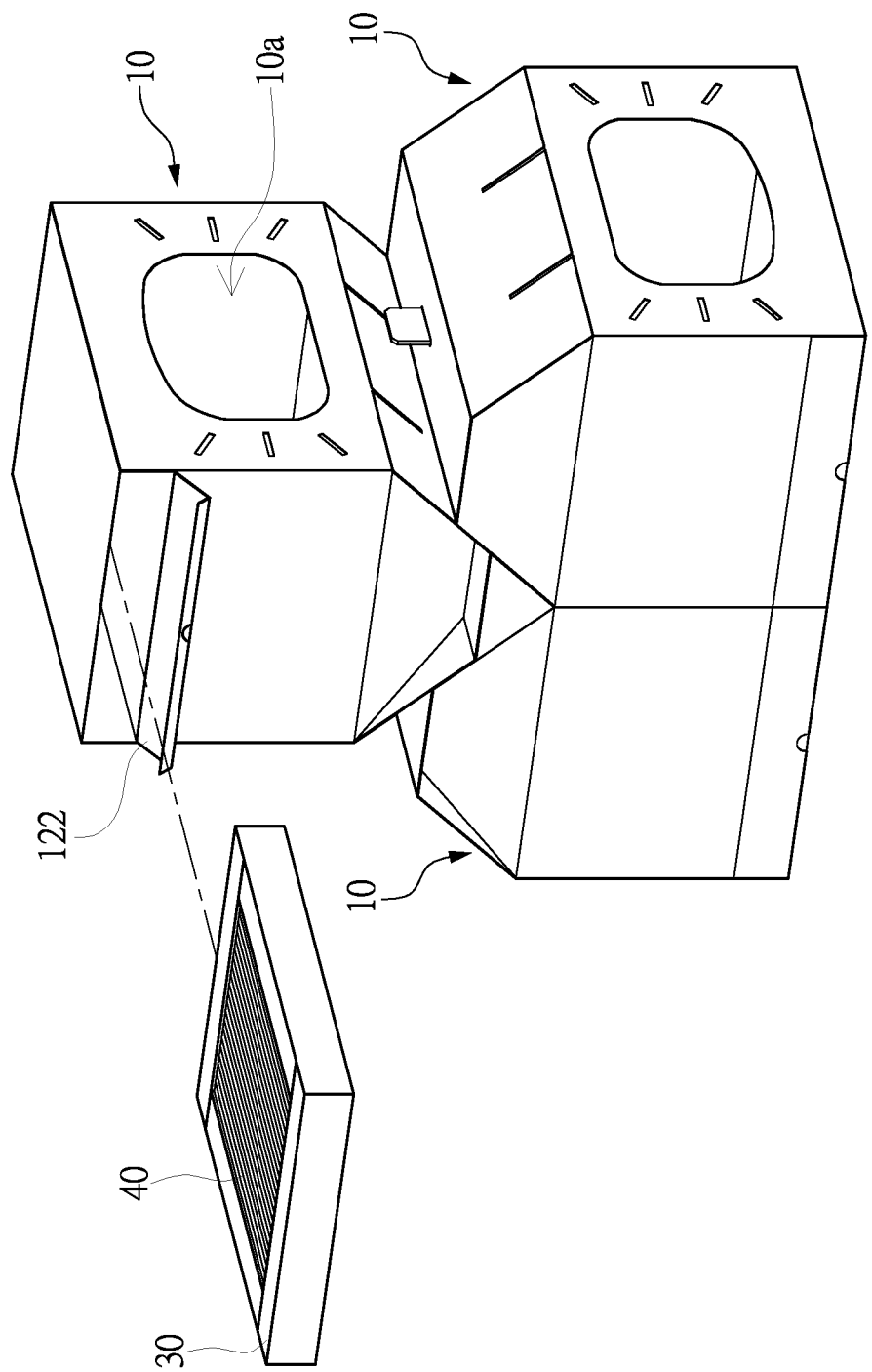
FIGS. 13 and 14 are schematic views of three pieces of the pet furniture according to the present disclosure assembled together.
Figure 14:
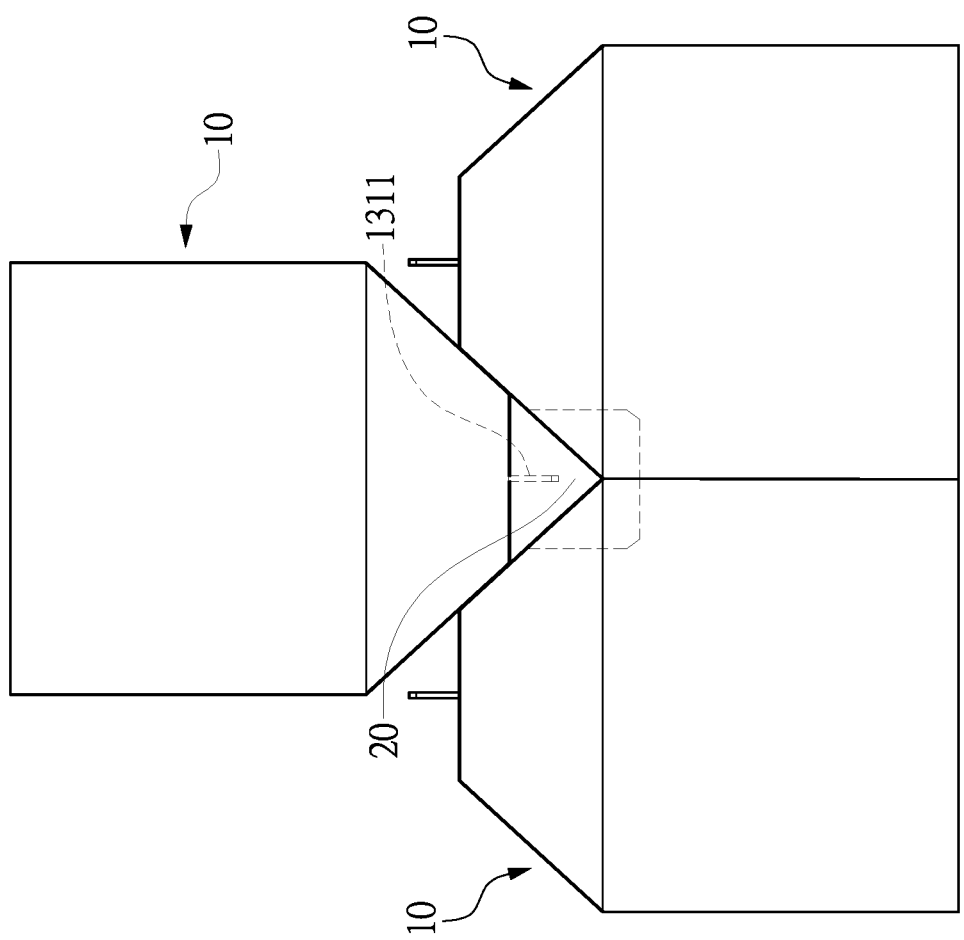

With reference to FIGS. 12 to 14, the middle portion of the engaging part 20 includes a top portion engaging structure 202, which can be exemplified as a through hole. The pet furniture 1 can include a connecting structure 1311 correspondingly, which can be exemplified as a protrusion. In this way, the two pieces of pet furniture 1 connected to each other through the engaging part 20 can be connected to another pet furniture 1 through the top portion engaging structure 202 of the engaging part 20 and the connecting structure 1311 of the another pet furniture 1 such that the another pet furniture 1 is disposed upside down between two pieces of pet furniture 1. In other words, one single engaging part 20 connects three pieces of pet furniture 1 together, in which the pet furniture 1 that is disposed upside down can still include a liftable door panel 122, which allows the auxiliary carrier 30 to be disposed in the accommodating space 10a.

Figure 11:
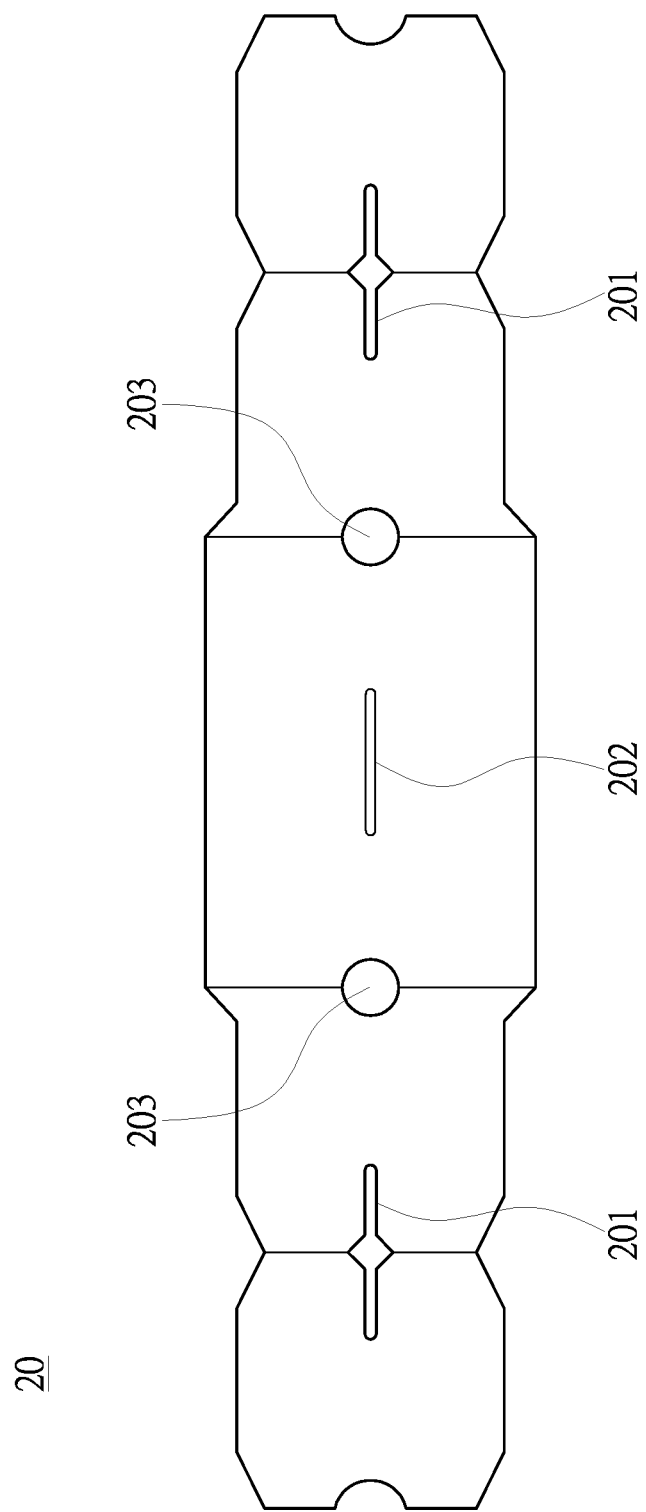
FIG. 11 is a schematic view of the engaging part of the pet furniture according to the present disclosure unfolded.
Figure 15:
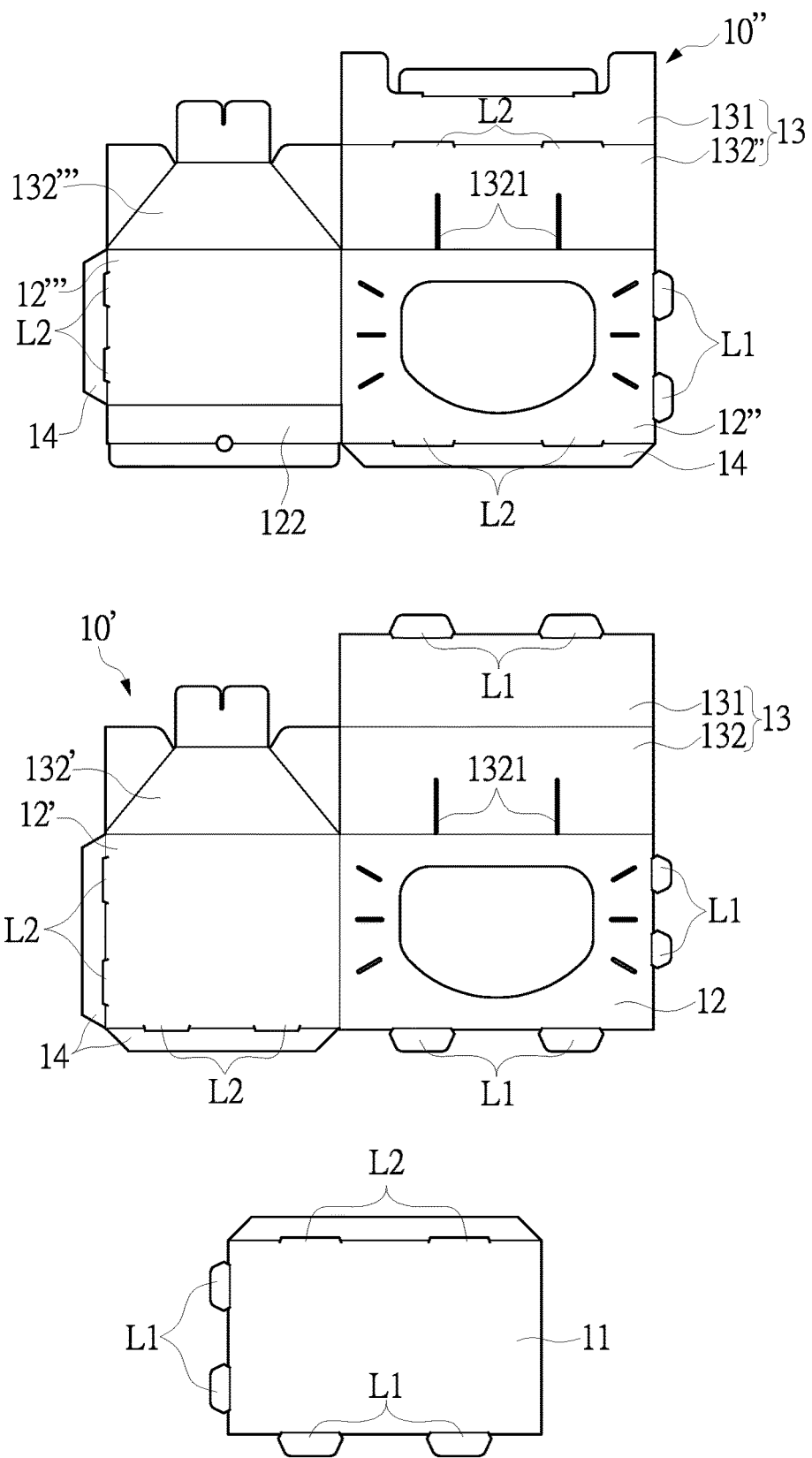
FIGS. 15 and 16 respectively show the schematic view of the box of the pet furniture unfolded and the engaging part according to another embodiment unfolded.
Figure 16:
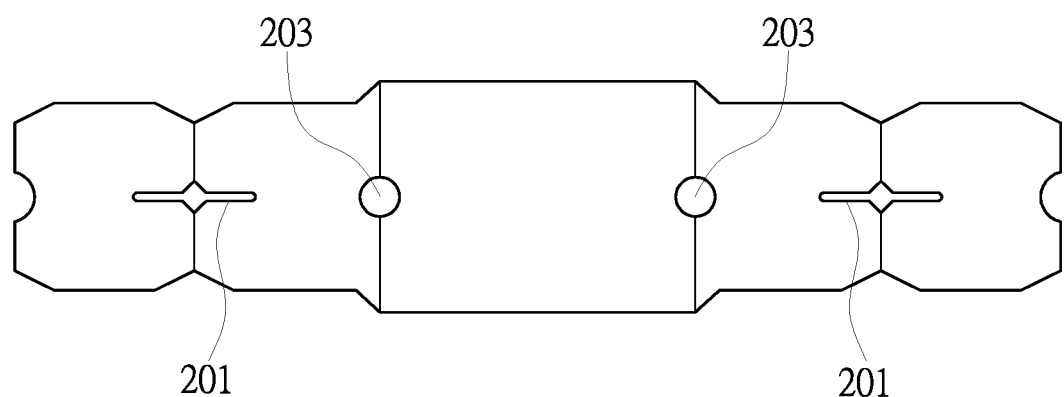

In other embodiments, the bottom board 11, the surrounding board 12, the top portion 13, and the engaging part 20 are designed in different manners according to actual needs and are not limited to the way they are exemplified in FIGS. 3A, 3B and 11. More specifically, referring to FIGS. 15 and 16, the bottom board 11 can be an independent component that is not connected to the surrounding boards 12. On the other hand, one side of the bottom board 11 can include a second engaging structure L2, and one side of the surrounding board 12 connected to the bottom board 11 can include a first engaging structure L1 correspondingly. Furthermore, in the embodiment shown in FIGS. 15 and 16, the top board 131 does not include the connecting structure 1311 and the engaging part 20 does not include the top portion engaging structure 202.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A pet furniture including a box, comprising a housing, and a plurality of sheets, the housing including an accommodating recess recessed and concavely formed on a side thereof, the plurality of sheets being detachably and erectly disposed in the accommodating recess, wherein when the plurality of sheets are in the accommodating recess, the wide side of each of the plurality of sheets is exposed at the opening of the accommodating recess;

wherein the housing includes a bottom board and four side wall boards bendably connected to the edges of the bottom board, the bottom board having a first engaging through hole and a second engaging through hole spaced apart from each other and disposed near the at least one of side wall boards, at least one of the side wall boards including an auxiliary engaging portion, the auxiliary engaging portion including a first auxiliary board and a second auxiliary board, wherein when the side wall boards and the bottom board form the housing, the auxiliary engaging portion passes through the second engaging through hole and is located on a side of the bottom board opposite the accommodating recess, in which the first auxiliary board adheres to the outer surface of the bottom board, and the second auxiliary board passes through the first engaging through hole correspondingly.

2. The pet furniture according to claim 1, wherein the first auxiliary board and the second auxiliary board respectively have a width equal to or smaller than the widths of the first engaging through hole and the second engaging through hole corresponding thereto.

3. The pet furniture according to claim 1, wherein the first engaging through hole is located at where the bottom board is connected to the side wall board, and the second engaging through hole is near the first engaging through hole, the second engaging through hole being on the side of the first engaging through hole away from the side wall board.

4. The pet furniture according to claim 3, wherein the distance between the first engaging through hole and the second engaging through hole equals to the length of the first auxiliary board.

5. The pet furniture according to claim 1, wherein two of the side wall boards have two auxiliary fixing through holes, in which when the bottom board and the side wall boards form the housing, a part of the two side wall boards is inserted into the two auxiliary fixing through holes.

6. The pet furniture according to claim 5, wherein two of the side wall boards each include one auxiliary engaging portion, and the other two of the wide wall boards each include two auxiliary fixing through holes.

7. The pet furniture according to claim 6, wherein when the bottom board and the side wall boards form the housing, each auxiliary fixing through hole is collinear with the nearby second engaging through hole.

8. The pet furniture according to claim 1, further comprising at least one auxiliary holding structure disposed in the box for a user to get hold of the box.

9. The pet furniture according to claim 5, wherein the pet furniture includes two auxiliary holding structures, and wherein the two auxiliary holding structures are through holes respectively formed in two of the side wall boards.

* * * * *